United States Patent
Klank et al.

(10) Patent No.: US 11,247,526 B2
(45) Date of Patent: Feb. 15, 2022

(54) ROLL STABILIZER AND USE OF A ROLL STABILIZER IN A MOTOR VEHICLE

(71) Applicant: ZF Friedrichshafen AG, Friedrichshafen (DE)

(72) Inventors: Michael Klank, Osnabrück (DE); Christoph Elbers, Stemwede (DE); Alexander Haegele, Alfhausen (DE); Frank Berger, Lübbecke (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 101 days.

(21) Appl. No.: 16/608,250

(22) PCT Filed: Mar. 27, 2018

(86) PCT No.: PCT/EP2018/057695
§ 371 (c)(1),
(2) Date: Oct. 25, 2019

(87) PCT Pub. No.: WO2018/197137
PCT Pub. Date: Nov. 1, 2018

(65) Prior Publication Data
US 2020/0198434 A1  Jun. 25, 2020

(30) Foreign Application Priority Data

Apr. 27, 2017 (DE) .................... 10 2017 207 116.8

(51) Int. Cl.
*B60G 21/055* (2006.01)
*H02K 5/24* (2006.01)
(Continued)

(52) U.S. Cl.
CPC .......... *B60G 21/0555* (2013.01); *H02K 5/24* (2013.01); *H02K 7/116* (2013.01);
(Continued)

(58) Field of Classification Search
CPC .............. B60G 21/055; B60G 21/0555; B60G 2202/42; B60G 2202/442; B60G 21/10;
(Continued)

(56) References Cited

U.S. PATENT DOCUMENTS 2,931,248 A * 4/1960 Walton .................. F16H 49/001
74/640
4,757,220 A 7/1988 Pouillange
(Continued)

FOREIGN PATENT DOCUMENTS

DE         102 43 809 A1     5/2004
DE   10 2006 058 133 A1     6/2008
(Continued)

OTHER PUBLICATIONS

Description Translation for EP 1820675 from Espacenet (Year: 2007).*
(Continued)

*Primary Examiner* — James A English
*Assistant Examiner* — Daniel M. Keck
(74) *Attorney, Agent, or Firm* — Finch & Maloney, PLLC; Michael Bujold; Jay Franklin

(57) ABSTRACT

A roll stabilizer for a motor vehicle having a housing (137, 237) with a first stabilizer element (110, 210) coupled to the housing and an electric motor (150, 250) located in the housing (137, 237). The transmission (160, 260) is coupled to the electric motor (150, 250) on a drive side, and the output side of the transmission (160, 260) is coupled to a second stabilizer element (115, 215) such that the stabilizer elements are electromechanically rotatable with respect to one another. The electric motor is designed as a Vernier motor.

10 Claims, 3 Drawing Sheets

(51) Int. Cl.
*H02K 7/116* (2006.01)
*F16H 1/36* (2006.01)
*F16H 49/00* (2006.01)
*F16H 57/00* (2012.01)
*B60G 21/10* (2006.01)

(52) U.S. Cl.
CPC ............ *B60G 2202/42* (2013.01); *F16H 1/36* (2013.01); *F16H 49/001* (2013.01); *F16H 57/0006* (2013.01)

(58) Field of Classification Search
CPC ...... B60G 2204/4191; B60G 2206/427; H02K 5/24; H02K 7/116; F16H 1/36; F16H 49/001; F16H 57/0006
See application file for complete search history.

(56) References Cited

U.S. PATENT DOCUMENTS

| | | | |
|---|---|---|---|
| 10,330,188 | B2 | 6/2019 | Koch et al. |
| 2004/0245887 | A1 | 12/2004 | Fujinaka |
| 2005/0236793 | A1* | 10/2005 | Taneda ............... B60G 21/0555 280/124.107 |
| 2010/0072725 | A1 | 3/2010 | Woellhaf et al. |
| 2015/0069875 | A1 | 3/2015 | Lipo et al. |
| 2018/0056172 | A1 | 3/2018 | Shigeta et al. |
| 2021/0009190 | A1* | 1/2021 | Wang ..................... B60G 7/006 |

FOREIGN PATENT DOCUMENTS

| | | | |
|---|---|---|---|
| DE | 10 2008 041 415 A1 | 2/2010 | |
| DE | 10 2015 206 064 A1 | 10/2016 | |
| EP | 1187302 A2 * | 3/2002 | ............... H02K 1/12 |
| EP | 1 820 675 A1 | 8/2007 | |
| WO | 2006/135088 A1 | 12/2006 | |
| WO | 2013/189649 A1 | 12/2013 | |
| WO | 2016/155715 A1 | 10/2016 | |
| WO | WO-2018197134 A1 * | 11/2018 | ......... B60G 21/0555 |

OTHER PUBLICATIONS

Description Translation for WO 2013/189649 from Espacenet (Year: 2013).*
Description Translation for WO 2016/155715 from Espacenet (Year: 2016).*
German Office Action Corresponding to 10 2017 207 116.8 dated Mar. 21, 2018.
International Search Report Corresponding to PCT/EP2018/057695 dated Jul. 19, 2018.
Written Opinion Corresponding to PCT/EP2018/057695 dated Jul. 19, 2018.

* cited by examiner

ROLL STABILIZER AND USE OF A ROLL STABILIZER IN A MOTOR VEHICLE

This application is a National Stage completion of PCT/EP2018/057695 filed Mar. 27, 2018, which claims priority from German patent application serial no. 10 2017 207 116.8 filed Apr. 27, 2017.

FIELD OF THE INVENTION

The invention concerns a roll stabilizer and its application in a motor vehicle.

BACKGROUND OF THE INVENTION

Active roll stabilizers with a hydraulic or an electric motor actuator are known. In this case, a passive roll stabilizer is separated and an actuator comprising of a motor and a transmission is positioned between the stabilizer elements. The actuator can twist the two stabilizer elements against each other to minimize the rolling of the motor vehicle due to impulses of the roadway or during swerving or driving around curves. In this case, large actuating power is required so that, due to the limited assembly space, the motor and a transmission are positioned at the respective vehicle axle and axially next to each other.

An actuator is known through the EP 1 820 675 A1 for an active roll stabilizer whereby the actuator has an electric motor with a downstream three-stage planetary transmission which generates the output drive at the output side through its last planetary carrier. The electric motor and the planetary transmission are installed next to each other in a common enclosure of the actuator, whereby one side of the housing is connected in a rotationally fixed manner with its first stabilizer element. The second stabilizer element is connected in a rotationally fixed manner with the planetary carrier at the output side of the planetary transmission. During activation of the electric motor, the two stabilizer elements are twisted against each other to controllably counteract rolling movement of the vehicle's chassis.

SUMMARY OF THE INVENTION

Based on the above mentioned state of the technology, the object of the invention is improving an active roll stabilizer in terms of the available assembly space, as well as the optimization of the drive.

The invention includes the characteristics of the independent claims of the invention. Advantageous further embodiments result from the dependent claims.

In a first aspect, the invention concerns a roll stabilizer for a motor vehicle comprising an actuator with a housing, connected to the housing in a rotationally fixed manner is a first stabilizer element, and an electric motor installed and positioned in the housing. The transmission is connected on the drive side with an electric motor and on the output drive side with a second stabilizer element so that the stabilizer elements can be twisted against each other electro-mechanically. The invention is characterized by an electric motor which is designed as a Vernier motor and is connected, as a drive, to the transmission. A control unit captures the current driving situation and sends signals to electronics of the actuator, so that the motor rotates the transmission in one of the possible directions of rotation and thereby, depending on the drive situation, causes opposite rotation of the stabilizer elements. The inclination of the vehicle in a direction outside the curve can thus be changed or minimized, respectively. Also, the roll of the vehicle, due to an unevenness of the road, can be compensated for so that the impulse leads in the ideal case to no rolling movement of the vehicle. The passengers observe the lower inclination in curves as being more comfortable and the impulses, due to unevenness of the road, results in a driving experience similar to that on a flat road, because rolling is prevented or minimized.

The electric motor (E-Motor) is preferably designed as a brushless Vernier motor. This kind of E-Motor represents a highly efficient electric motor which, in comparison to conventional electric motors, has an improved volume efficiency. A Vernier motor can generate a high torque with less volume than a conventional E-Motor with a correspondingly larger volume. In other words, an E-motor can be made smaller and can at the same time generate at least the same or even higher power. In other words, the size can be reduced in comparison to the E-motor conventionally used in roll stabilizers, so that either the installation space for further components required within the actuator is available. Or rather, the size of the actuator can be reduced as a whole. Thus, a very compact roll stabilizer can be provided for each respective axle of the chassis so that the required assembly space, for instance for the steering, in particular the rear axle steering, or preferably an electric axle drive can be applied.

The Vernier motor is not only smaller than a comparable electric motor. It is also lower in weight and more power efficient than a comparable conventional E-Motor and has sufficient torque to effect rotation of the stabilizer elements against each other by means of the transmission. Through this construction, the size and therefore also the weight of the magnets can be reduced. Thus, less rare-earth needs to be used for the manufacture of the magnets which significantly reduces the cost of the Vernier motor as compared to a conventional E-Motor with the same power.

In a first embodiment, the Vernier motor is positioned with its longitudinal axis parallel to the longitudinal axis of the transmission. Hereby, the transmission is preferably positioned axially parallel to the longitudinal axis of the actuator housing so that also the longitudinal axis of the ends of the stabilizer elements is positioned axially parallel. Preferably, the longitudinal axes are positioned on top of each other which results in a common longitudinal axis. Contrary to the previously mentioned axis-parallel positioning, the coaxial construction can provide a more compact construction of the actuator and the roll stabilizer. This results in total, through the use of the Vernier motor, in an advantageous reduction in the assembly space.

In an additional preferred embodiment, the transmission is mainly, in particular completely, integrated within the E-Motor. In other words, the transmission is regarding its axial length substantially positioned within the rotor and/or stator. This results therefore in a compact drive unit, because the E-Motor and the transmission do not need to be positioned axially next to each other in the housing of the actuator. Therefore, the axial length of the actuator can clearly be reduced. Preferably, the axial length (width of the actuator) is reduced by half, and highly preferably by a third of the comparable actuator.

The transmission is designed in a preferred construction as in a wave transmission whereby the rotor of the Vernier motor is connected with the elliptic disc of the wave transmission. Wave transmissions have a low number of construction parts and can transfer large torques. Same applies with so-called voltage wave transmissions or harmonic drive transmissions, in English characterized as strain wave gear (SWG), it is a transmission with an elastic transmission element which is characterized by a high gear ratio and stiffness. It has mainly three components. Required is an elliptic steel disc with a shrunken roller bearing and a thin race (also called wave generator), whereby the elliptic disc causes the drive of the transmission. In addition, a deformable, cylindrical steel sleeve with outer gearing, the so-called flex-spline is required whereby the steel sleeve creates the output drive. Finally, a stiff cylindrical outer ring with inner gearing, the circular spline, is required. At the lower and the upper edge of the outer ring, its gear meshes with the Fiexspline. The outer gear ring of the steel sleeve has lesser teeth than the gearing of the outer ring. Preferably, that difference is two teeth. Flexspline and Circular spline have with each rotation a relative movement by two teeth, so that a rotational movement is created at a high gear ratio.

In an additional preferred embodiment, the transmission is designed as rotational impeller transmission, preferably a planetary transmission with at least one stage, or also as a Wolfram transmission. Rotational impeller transmissions can also transfer large torques and have for instance, in form of a planetary transmission, an advantageous quiet running. The Vernier motor drives the sun gear (in a multi-stage planetary transmission, the first sun gear) and the torque is transferred to the second stabilizer element via (with multi-stages, the last) the planetary carrier. It is rotatable relative to the housing and thus with respect to the first stabilizer element. The planetary carrier has at least three planetary gear which mesh with a ring gear which is positioned in the housing. Preferably, the ring gear is introduced into the housing so that the ring gear and the housing are designed as one-piece part.

Preferably, the Vernier motor has relative to the housing of the actuator a rotationally fixed stator, wherein inside of the stator is a rotatably mounted rotor connected with the transmission. In this type of electric motor, magnets are arranged on the outside of the stator, but they are much smaller in size than conventional electric motors. Thus, the required space of the Vernier electric motor is reduced overall. For this reason, in a preferred embodiment, the outer diameter of the actuator, without power loss, can be comparatively smaller and thus the space of the roll stabilizer can be reduced.

In a further preferred embodiment, at least one means, preferably a spring, for minimizing noise is provided in the at least one-stage planetary gear. The means may cause a bias of one or more of the gears or planetary carrier, so that it can not, especially when changing direction, come to a flank impact within the transmission. This is here important, because the operation noise of the actuator can be transferred through the stabilizer elements directly to the chassis and are audible by the passenger. For further acoustic decoupling of the actuator, one or more decoupling elements can be provided outside of the transmission, for instance between the transmission and the second stabilizer element. These decoupling elements can be integrated both inside the housing of the actuator or outside in the stabilizer elements themselves.

In another advantageous embodiment, the planetary transmission has, at least in each planetary stage, at least a two-part planetary gear whereby the two partial planetary gears are, preferably identical in construction and preloaded with a spring. In particular; the spring acts in the sense of a torsion spring so that flank impact is effectively avoided, since the partial planet gears are supported against the teeth of the ring gear. In addition, a preload in the axial direction can be provided so that movement and striking of the planetary gears in the axial direction can be avoided. The previously mentioned springs can be made of spring steel or an elastomer, or other suited elastic material, and can be designed in the form of a ring or in the form of disks.

In an additional aspect of the invention, an application of the roll stabilizer according to the invention is provided in a chassis of a motor vehicle is provided. The active roll stabilizer can be positioned on the front axle and/or on the rear axle. Due to the low energy consumption of the Vernier electric motor according to the invention, less energy is withdrawn from the electrical system of the motor vehicle for roll stabilization than when using an actuator with a conventional E-Motor, Beside the lower energy consumption during rotation, lower operating noise for the actuator occurs through the decoupling or preload, respectively. In addition, a weight reduction occurs in the sense of the economy of the vehicle with an active roll stabilizer.

The previously mentioned drive, by means of a Vernier motor, is also suitable for other applications, such as window lifters in vehicle doors, or similar actuating drives. Here, a compact, energy efficient and high-torque drive are required.

BRIEF DESCRIPTION OF THE DRAWINGS

The invention will be described below with reference to preferred embodiments with reference to the drawings. The drawings show.

DETAILED DESCRIPTION OF THE PREFERRED EMBODIMENTS

Figure 1:
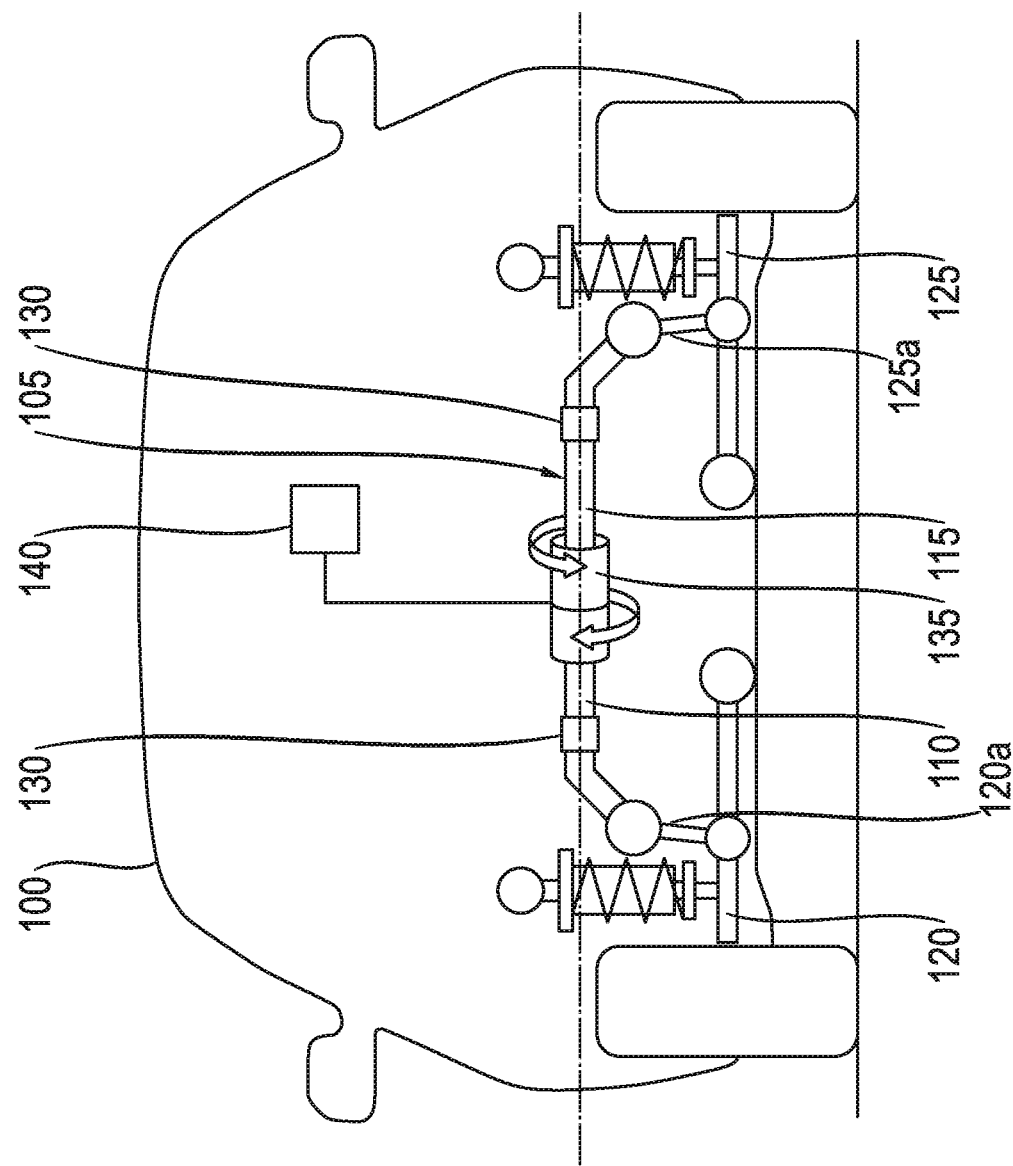
FIG. 1 is a schematic view of a vehicle axis with an active roll stabilizer.

FIG. 1 shows a schematic representation of a vehicle 100 having a roll stabilizer 105 according to an embodiment of the present invention. The roll stabilizer 105 is realized as a two-part torsion rod with a first stabilizer element 110 and a second stabilizer element 115. Here, one end of the first stabilizer element 110 is connected with a first wheel suspension element 120 of the vehicle 100, and one end of the second stabilizer element 115 is connected with a second wheel suspension element 125 of the vehicle 100. The ends of the stabilizer elements 110, 115 are connected with pivotally mounted hinge supports 120a, 125a, which are connected with the chassis. The wheel suspension elements 120, 125 are, for instance, pivoted opposite and each assigned to a wheel control arm of the vehicle 100. The stabilizer elements 110, 115 are each installed by means of a chassis-solid construction bearing 130, pivotable around a common rotational axis D-D, at the chassis of the vehicle 100. The rotational axis D-D corresponds hereby in this example to a transverse axis of the vehicle 100. The stabilizer elements 100, 115, can be rotated against each other by means of an actuator 135 when the control unit 140 senses for instance an uneven road and this impulse is compensated for by a targeted rotational movement so that the chassis does not experience rolling movement, as it would be the case due to the copy effect of a passive roll stabilizer.

Figure 2:
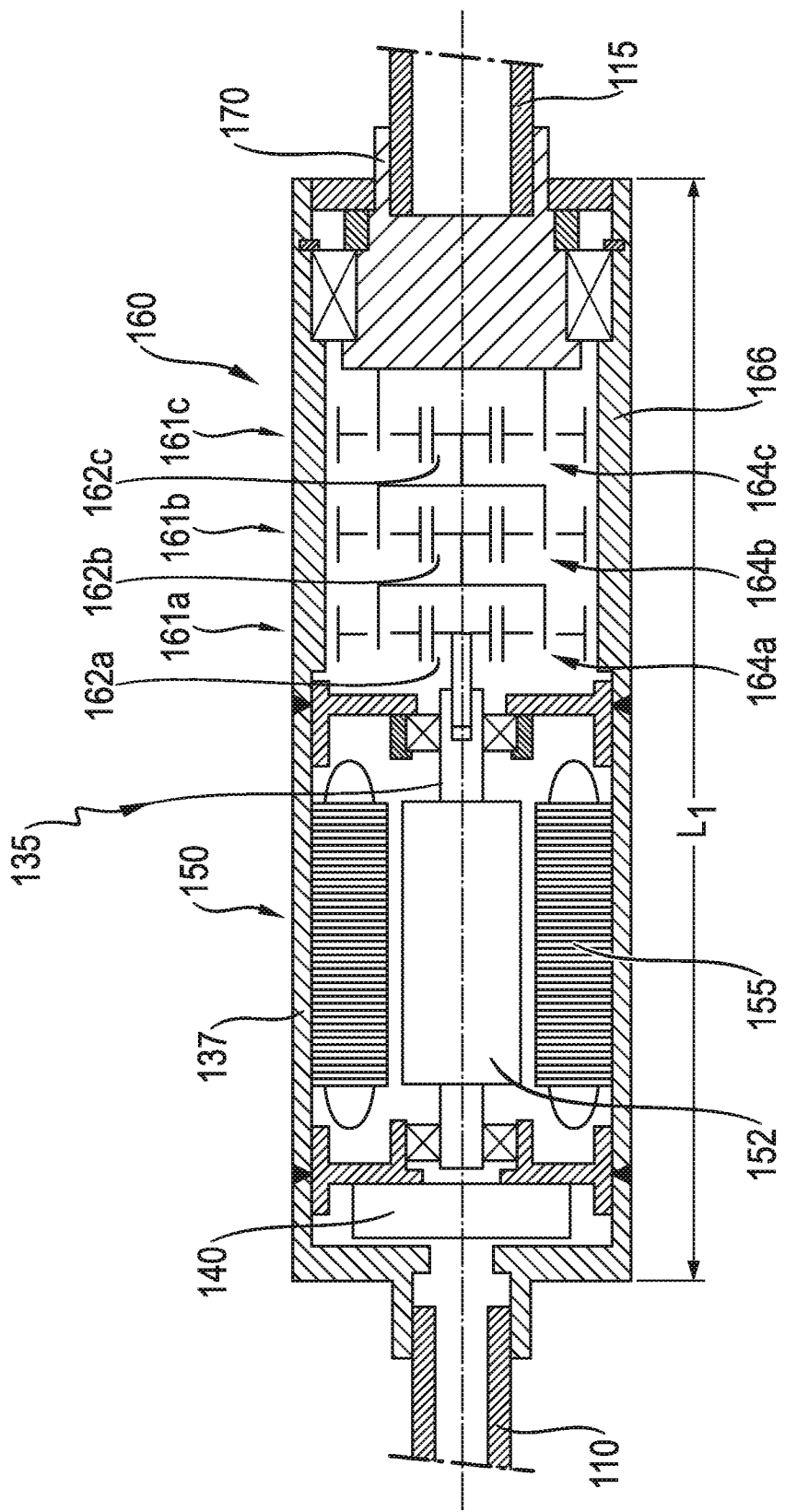
FIG. 2 is a detailed view of an embodiment of the roll stabilizer.

FIG. 2 shows the construction of an actuator 135 of a conventional active roll stabilizer 105 in accordance with the state of the technology. The roll stabilizer 105 has an actuator 135 with a housing 137. Positioned in the housing 137 is an E-Motor 150 with a housing-mounted stator 155, as well as a rotor 152 which is rotatably positioned in the housing 137. Further, a control unit or electronics 140, respectively for operating the actuator 135 is housed in the housing 137 in the direction of the E-Motor end. Axially next to the E-Motor, a transmission 160 is positioned in the form of a planetary transmission. The E-Motor 150 is operationally connected with the first sun gear 162a of the first planetary stage 161a. The planetary transmission has a total of three planetary stages 161a, 161b, 161c with three planetary carriers 164a, 164b, 164c. The planetary gears of the respective planetary carriers 164a, 164b, 164c mesh with a ring gear 166 which is positioned on the inner side of the housing. A first stabilizer element 110 is integrally connected to the E-Motor end of the actuator 135. The second stabilizer element 115 is operationally connected with the last planetary carrier 164c. The torque of the E-Motor 150 is transmitted via the transmission 160 to the stabilizer element 115, so that there is rotation of the stabilizer element 115 relative to the housing 137 and ultimately with respect to the stabilizer element 110. The housing has an axial extent L1, which results from the arrangement of the E-Motor 150 next to the transmission 160. It can clearly be seen that the E-Motor 150 and the transmission 160 each occupy about one half of the width of the actuators as installation space of the actuator.

Figure 3:
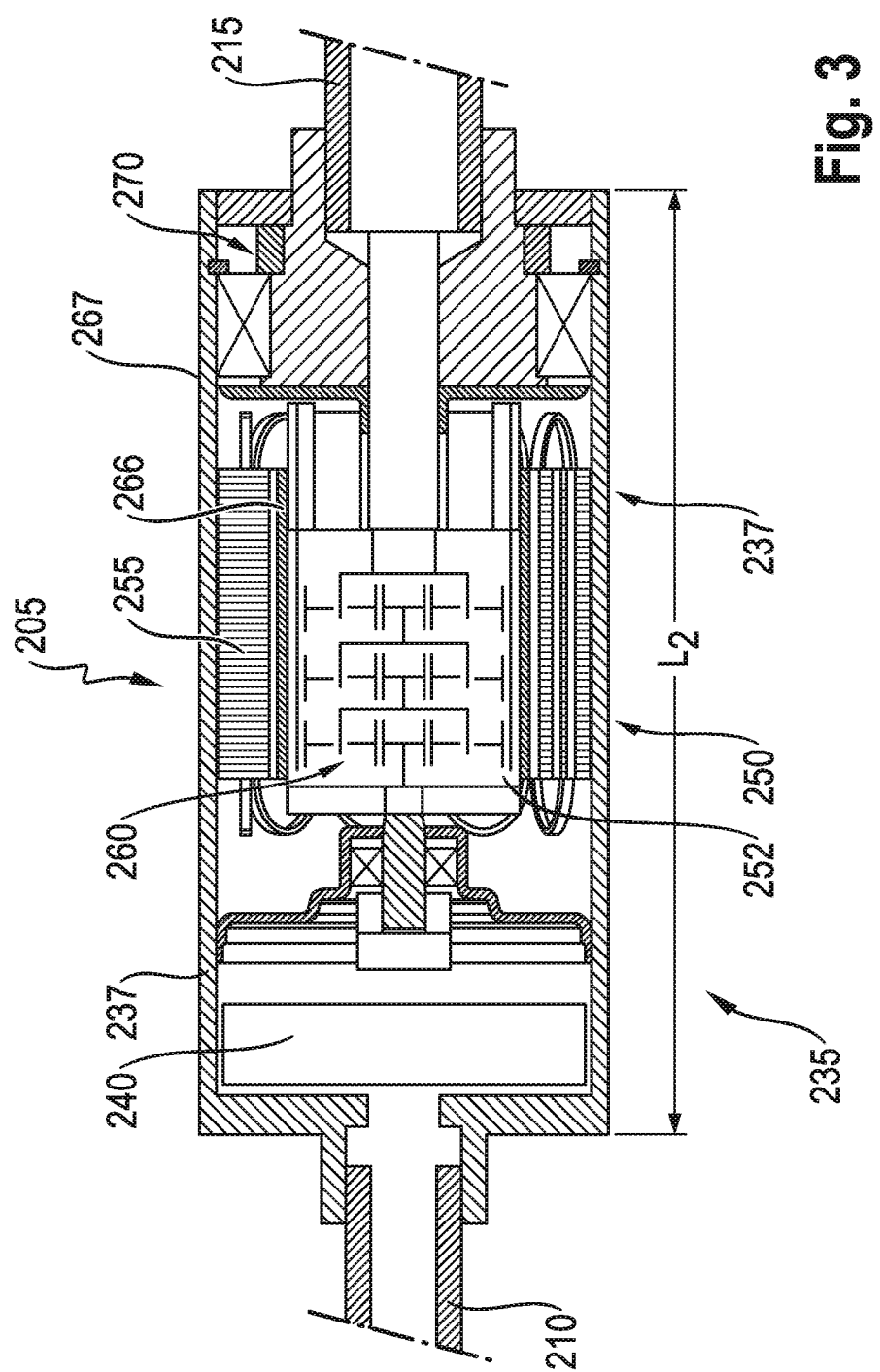
FIG. 3 is a detailed view of an embodiment of a roll stabilizer according to the invention.

FIG. 3 shows an embodiment according to the invention, in which a much more compact construction of the actuator can clearly be seen. The planetary transmission 260 is designed analogously to the transmission in FIG. 2 and is disposed here within the E-Motor 250. Within the housing 237, the control unit or electronics 240, respectively, of the actuator 235 is accommodated analogously to the arrangement according to FIG. 2. In other words, the transmission does not axially extend substantially beyond the Vernier motor. The ring gear 256 is positioned inside of the rotor 252 and supported on the housing 235 via a support member 267. Through the coaxial positioning of the E-Motor 250 and the transmission 260, considerable assembly space can be saved. The width of the actuator 235 can be reduced to $L_2$ by approximately ⅔ to ½ the width $L_1$ of the actuator 135 of FIG. 2 (in accordance with the state of the technology). This is especially possible because the Vernier motor, in this case with a hollow rotor, takes up less space and can accommodate the transmission in its interior. It is obvious, in accordance with FIG. 2, that in a conventional E-Motor a transmission cannot be integrated in the E-Motor.

In addition to the gear arrangement shown in FIG. 3, further transmissions are conceivable that can be arranged within the electric motor or the Vernier motors.

REFERENCE CHARACTERS

100 Vehicle
105, 205 Roll Stabilizer
110, 210 first Stabilizer Element
115, 215 second Stabilizer Element
120 first Wheel Suspension Element
120a first Hinged Support
125 second Wheel Suspension Element
125a second Hinged Support
130 Structure Bearing
135, 235 Actuator
137, 237 Housing
140, 240 Control Unit, Electronics
150, 250 Electric Motor
152, 252 Rotor
155, 255 Stator
160, 260 Transmission
161a,b,c Planetary Stage
162a,b,c Sun Gear
164a,b,c Planetary Carrier
166, 266 Ring Gear
170, 270 Output Drive

The invention claimed is:

1. A roll stabilizer for a motor vehicle, the roll stabilizer comprising:
    an actuator having a housing that has a first end and a second end, the first end of the housing being connected to a first stabilizer element, an electric motor being located within the housing, the electric motor having a longitudinal axis, and the electric motor having a stator and a rotor arranged radially within the stator, the rotor being rotatable relative to the stator and the housing,
    a transmission having at least one planetary gearset comprising a sun gear, a ring gear and planet gears, and the sun gear of the at least one planetary gearset being fixed to the rotor of the electric motor on a drive side of the transmission,
    the planet gears of the at least one transmission being connected with a second stabilizer element, on an output drive side of the transmission, such that the first and the second stabilizer elements are electromechanically rotatable in opposite rotational directions,
    the electric motor is designed as a Vernier-motor for producing high torque, and
    the sun gear, the ring gear and the planet gears of the at least one planetary gearset being axially arranged completely within the rotor of the electric motor.

2. The roll stabilizer according to claim 1, wherein the longitudinal axis of the electric motor is parallel to a longitudinal axis of the transmission, and the electric motor and the transmission have a common longitudinal axis.

3. The roll stabilizer according to claim 1, wherein the transmission is axially positioned completely within the rotor of the electric motor.

4. The roll stabilizer according to claim 3, wherein the ring gear of the at least one planetary gearset is fixed to the housing.

5. The roll stabilizer according to claim 3, wherein the transmission is a planetary transmission having the at least one planetary gearset,
    the stator is arranged within and connected to the housing in a rotationally fixed manner, and
    the rotor is coupled to the sun gear of the at least one planetary gearset, and the ring gear of the at least one planetary gearset is fixed to the housing.

6. The roller stabilizer according to claim 4, wherein the at least one planetary gearset comprises a plurality of planetary gearsets axially arranged completely within the rotor of the electric motor.

7. The roll stabilizer according to claim 6, wherein each of the plurality of planetary gearsets has two planet gears, and the two planet gears are structurally identical to one another.

8. The roll stabilizer according to claim 1, wherein the roll stabilizer is arranged in a chassis on at least one axle of the motor vehicle.

9. A roll stabilizer for a motor vehicle, the roll stabilizer comprising:
    an actuator having a housing that extends along an axis and has an input side and an output side, and the input side of the housing being connected to a first stabilizer element;
    an electric motor having a rotor and a stator, and the electric motor being arranged radially within the housing such that the stator is connected to the housing in a fixed manner and the rotor is supported radially within the stator and is rotatable relative to the stator and the housing;

a transmission having first and second planetary gearsets arranged adjacent each other along the axis, and each of the first and the second planetary gearsets having a sun gear, a ring gear and planet gears, the sun gears, the ring gears and the planet gears of the first and the second planetary gearsets being completely mounted axially and radially within the rotor, the sun gear of the first planetary gearset being connected with the electric motor, and the planet gears of the second planetary gearset being connected with a second stabilizer element;

the first and the second stabilizer elements being rotatable in opposite rotational directions; and the electric motor being designed as a Vernier-motor for producing high torque.

10. The roll stabilizer according to claim 9, wherein the ring gears of the first and the second planetary gearsets being fixed to the housing of the actuator.

* * * * *